O. L. BEAM.
DIRIGIBLE HEADLIGHT.
APPLICATION FILED JUNE 9, 1921.
1,419,603.
Patented June 13, 1922.
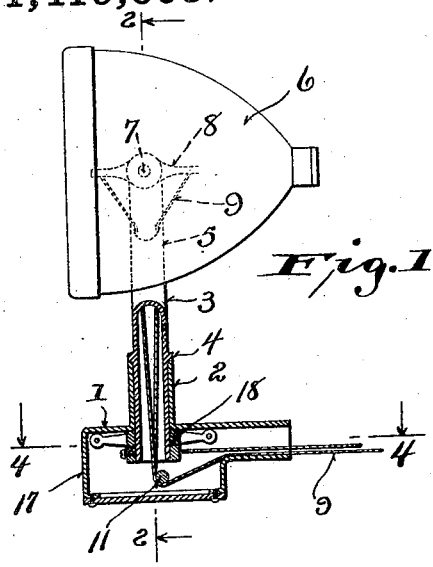
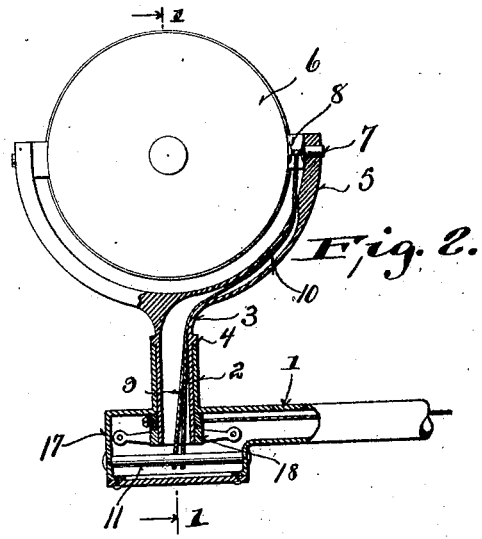
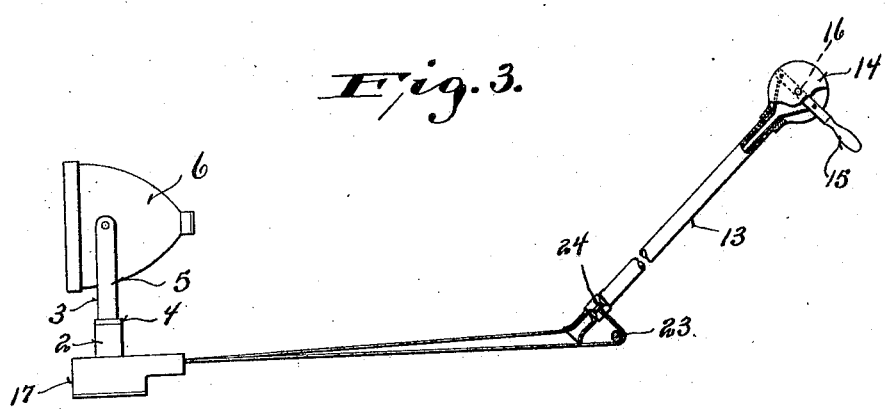
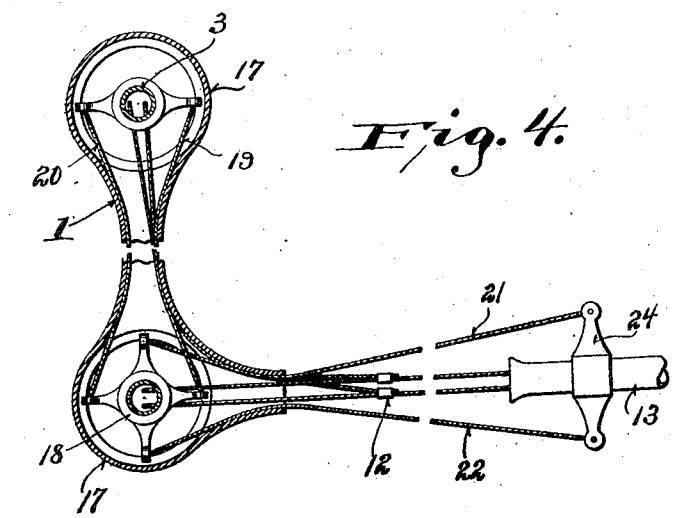
Inventor:
Otis L. Beam
Young & Young
Attorneys

UNITED STATES PATENT OFFICE.

OTIS L. BEAM, OF MILWAUKEE, WISCONSIN.

DIRIGIBLE HEADLIGHT.

1,419,603.

Specification of Letters Patent. Patented June 13, 1922.

Application filed June 9, 1921. Serial No. 476,196.

*To all whom it may concern:*

Be it known that I, OTIS L. BEAM, a citizen of the United States, and resident of Milwaukee, in the county of Milwaukee and State of Wisconsin, have invented certain new and useful Improvements in Dirigible Headlights; and I do hereby declare that the following is a full, clear, and exact description thereof.

My invention relates to a new and useful improvement in a dirigible headlight which is particularly adapted for use on motor vehicles and the like.

The principal object of my invention is to provide a structure of this kind which may be readily applied to any motor vehicle and which will be of simple construction and will permit the headlights to be turned in any direction by means readily accessible to the driver.

A further object of the invention is to improve the means by which the headlight casing is mounted so as to permit a direct connection to be easily made between the headlight casing and the means under control of the driver. The means by which the invention is carried out will be described in connection with the accompanying drawing:—

Figure 1 is a side elevation of a headlight casing with the means for operating same shown in section.

Figure 2 is a vertical sectional view on the line 2—2 of Figure 1.

Figure 3 is a side elevation of the invention showing the operating means under control of the driver.

Figure 4 is a sectional and plan view on the line 4—4 of Figure 1.

In the drawing the numeral 1 designates a housing extending transversely across the front of the vehicle and having an upwardly extending sleeve 2 at each end for receiving the vertical shafts 3, said shafts being provided with shoulders 4 whereby to provide a stepped bearing. Each of the shafts 3 is provided at its upper end with a yoke 5 in the arms of which the headlight casing 6 is supported by means of the trunnions 7. The headlight casing 6 is provided with a cross arm 8 extending to each side of one of the trunnions. To the ends of the arm 8, cables 9 are attached and extend downwardly through an opening 10 which extends through one arm of the yoke and through the shaft 3. Below the end of the shaft 3, the cables 9 are roven about a pin 11 and extend thence rearwardly to the point 12 where the cables leading over the two headlights are joined. The cables extend from this point rearwardly to the hollow inclined shaft 13 which is mounted adjacent to the steering column of the vehicle. The shaft 13 is formed at its upper end with an enlarged head 14 in which a lever 15 is pivoted for movement about fulcrum 16. The ends of the cables are attached to the lever 15 at opposite sides of its fulcrum whereby oscillation of the lever will produce a tilting movement of the headlight casing.

In order that the headlight casings may be moved laterally so as to illuminate the side of the roadway means are provided at the lower ends of the shafts 3 for rocking the same and the housing 1 is enlarged at each end as shown at 17 in order to receive this rocking means. The means for rocking the shafts 3 comprises a spider 18 secured to the lower end of each shaft. The forwardly and rearwardly extending arms of the spiders are respectively connected by the cables 19 and 20. The spider which is located on the same side as the steering column is provided with laterally extending arms to which are attached the cables 21 and 22 respectively. These cables extend rearwardly and are roven about the pin 23 which extends transversely in rear of the lower end of the shaft 13. This shaft is provided with a cross head 24 at its lower end to the opposite ends of which the cables 21 and 22 are attached.

From the foregoing description it will be seen that the driver by merely rocking the inclined shaft 13 may cause a lateral rocking movement of the shaft 3 to the lower end of which the cables 21 and 22 are connected. The connection formed by the cables 19 and 20 will simultaneously cause a like movement of the other shaft 3. The driver may also cause the headlight casings to tilt upwardly or downwardly by rocking the lever 15.

While I have shown and described the specific structural details of one form in which my invention may be embodied it will be understood that other changes and modifications may be made therein without departing from the spirit of the invention.

I claim:—

In a vehicle of the class described, a vertically disposed stepped bearing, a hollow shaft rotatably supported in said bearing and having a yoke at its upper end, said yoke having a passageway through one arm communicating with the inside of the shaft, a headlight casing tiltably mounted in said yoke, a spider secured to the lower end of said shaft, a similarly supported headlight casing, shaft and spider at the other side of the vehicle, cables connecting the forward and rearward portions of the respective spiders so as to cause the said shafts to rock in unison, an inclined hollow shaft adapted to be supported adjacent the steering column of the vehicle, a lever fulcrumed to swing in a vertical plane at the upper end of said inclined shaft, a pair of cables extending through said inclined shaft and attached at one end to said lever at opposite sides of its fulcrum and having branches at the other end attached to the respective headlight casings at opposite sides of its pivot, a reeving member in rear of the lower end of the inclined shaft and a pair of cables attached at one end to opposite sides of the lower end of said inclined shaft and roven about said reeving member and attached at the opposite end to opposite sides of one of said spiders.

In testimony that I claim the foregoing I have hereunto set my hand at Milwaukee, in the county of Milwaukee and State of Wisconsin.

OTIS L. BEAM.